United States Patent [19]

de Putter

[11] 4,351,791
[45] Sep. 28, 1982

[54] METHOD FOR INSTALLING A SEALING BODY IN A GROOVE OF A SOCKET AND PIPE PART OF PLASTIC MATERIAL

[75] Inventor: Warner J. de Putter, an Hardenberg, Netherlands

[73] Assignee: Wavin B.V., Zwolle, Netherlands

[21] Appl. No.: 216,965

[22] Filed: Dec. 16, 1980

[30] Foreign Application Priority Data

Dec. 21, 1979 [NL] Netherlands .......................... 7909293

[51] Int. Cl.³ .......................... B29C 27/16; B29C 7/00
[52] U.S. Cl. .................................... 264/267; 264/154; 264/314; 264/318; 264/334
[58] Field of Search ............... 264/322, 314, 315, 267, 264/328.1, 318, 334, 269, 328.2; 285/284, 291, 297, 422; 277/207 A

[56] References Cited

U.S. PATENT DOCUMENTS

| | | | |
|---|---|---|---|
| 3,020,054 | 2/1962 | Driancourt | 277/207 A |
| 3,260,540 | 7/1966 | Houot | 285/323 |
| 3,425,093 | 2/1969 | Ansette | 264/314 |
| 3,920,787 | 11/1975 | McDowell et al. | 285/297 |
| 4,070,429 | 1/1978 | Uhlig | 264/155 |
| 4,104,349 | 8/1978 | Hillgenberg | 264/155 |
| 4,173,362 | 11/1979 | Glover et al. | 277/207 A |
| 4,275,909 | 6/1981 | Yoshizawa et al. | 285/423 |

FOREIGN PATENT DOCUMENTS

2035165  6/1980  United Kingdom .................. 164/63

Primary Examiner—Willard E. Hoag
Attorney, Agent, or Firm—Wilkinson, Mawhinney & Theibault

[57] ABSTRACT

Method for installing a sealing body in a groove of a socket by forming a closed space in the inner side of the socket. Said closed space is bound by an inner core and an inflatable core being connected with each other by a connecting wall part and is filled with a flowable thermoplastic elastomer through an opening in the wall of the groove. After setting of the thermoplastic elastomer, the two cores are removed.

2 Claims, 5 Drawing Figures

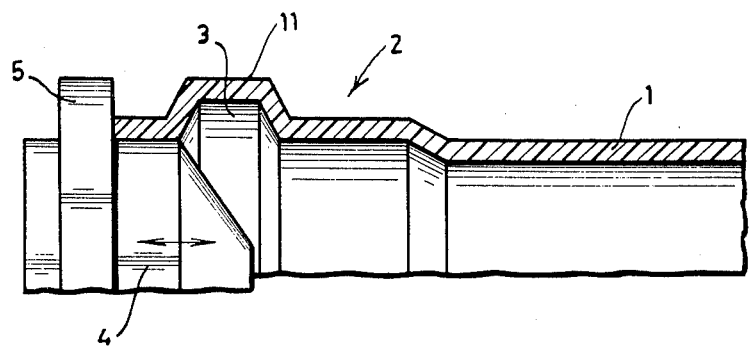
Fig: 1.
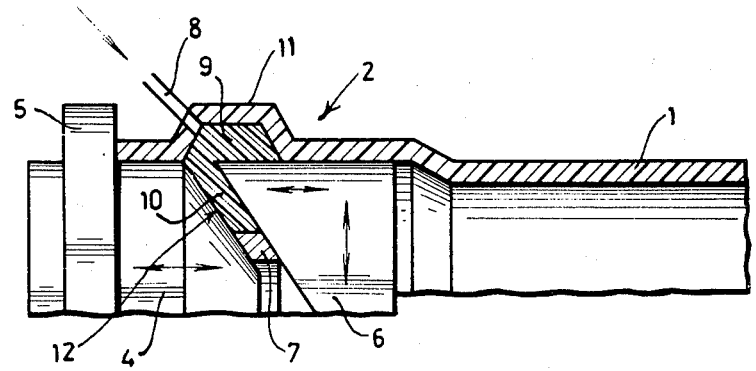
Fig: 2.
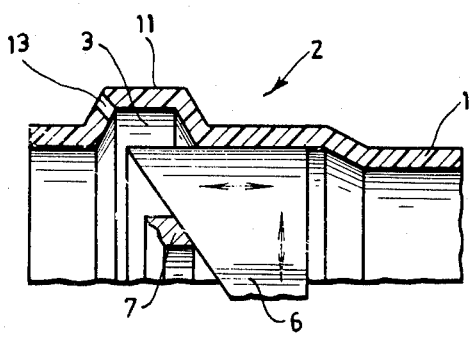
Fig: 3.

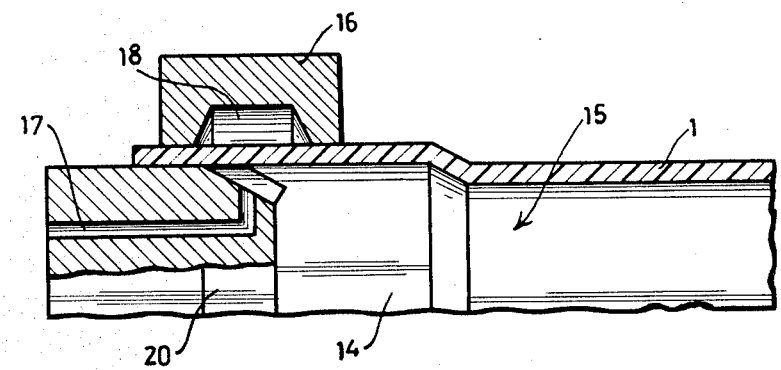
FIG: 4a.
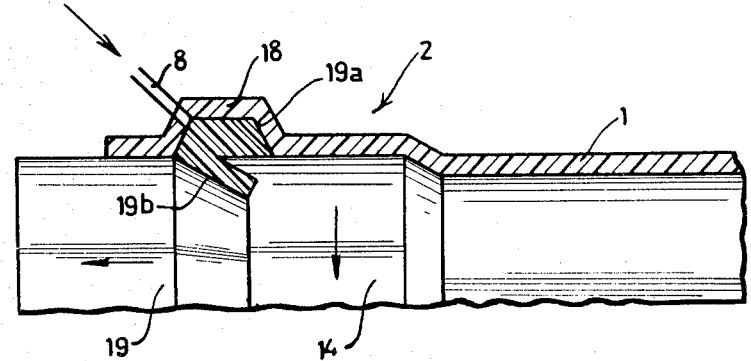
FIG: 4b.

METHOD FOR INSTALLING A SEALING BODY IN A GROOVE OF A SOCKET AND PIPE PART OF PLASTIC MATERIAL

BACKGROUND OF THE INVENTION

1. Field of the Invention

The present invention relates to a method for installing a sealing body of resilient material in a groove of a socket of plastic material, particularly thermoplastic material.

2. Description of the Prior Art

Methods for installing a sealing body in a groove of a socket of plastic material, have been used in the art. Said methods comprise installing an annular sealing body in the groove of a socket, the sealing body at least consisting of a head end and more preferably, of a head end being integral with a projecting sealing sleeve, being received in a special sealing sleeve receiving chamber, extending into the socket beside the groove.

A sealing sleeve of the latter type is, however, not absolutely essential as the sealing body may have a shape such that the projecting lip part or sleeve part of the sealing body adjoins the head end of the sealing body, situated within the groove.

A method as described hereinbefore, has the drawback that applying the annular sealing body is rather labor consuming, while the insertion of a male pipe part may cause said sealing body to be, at least partially, pushed out of the groove, which may give rise to leaking problems, whilst under extreme environmental conditions, the sealing body may also be pushed out of the groove.

SUMMARY OF THE INVENTION

In view of the foregoing factors and conditions of the prior art it is a primary object of the present invention to provide a method, which alleviates the disadvantages of the prior art methods.

This object is attained in accordance with the invention in that inside the socket a closed space is formed, which space embraces the groove, whereupon said space is filled with a flowable plastic elastomeric composition and the walls bounding the closed space are removed after setting of the composition.

Due to these measures, the plastic elastomeric composition in the closed space can be intimately bonded with a plastic material from which the groove is formed, so that the sealing body is on the one hand retained in a very reliable manner, excluding a dislodgement during transport or during the insertion of a male pipe part, whilst on the other hand, an intimate bonding between the plastic material, preferably the thermoplastic synthetic material of the pipe and the portion of a sealing body of thermoplastic elastomer being accomodated within the groove, excludes any chances of leakages.

The plastic elastomer, preferably a thermoplastic elastomer need, however, not necessarily be intimately bonded with the thermoplastic synthetic material, as in the case of a groove comprising walls tapering toward each other in the direction of the axis of the pipe part, this construction retains the sealing body.

In a preferred embodiment of the present invention a head end of a sealing body filling the groove and being integral with a sealing sleeve, is formed in the closed space embracing the groove.

In the latter manner an optimum seal is obtained when a male pipe part is inserted.

The presence of the projecting sealing sleeve part is not disadvantageous, as the entire sealing body may be intimately bonded with the socket.

The closed space is appropriately filled by perforating the groove wall, so that the groove chamber can be filled with a flowable liquid plastic elastomer, particularly a thermoplastic elastomer, from the outside. Preferably the material of the groove is kept in a thermoplastic condition for that purpose, so that an injection channel may be provided in the wall of a groove chamber.

When molding the groove, an opening can previously be applied in the groove wall, so that said groove can be provided with plastic elastomer, particularly thermoplastic elastomer, for molding the desired sealing body, from the outside.

The closed space is appropriately bounded by a core comprising a core part movable toward the inside of the socket and being connected with the core through a closed wall on moving said part toward the inside of the socket. of the sealing body.

During the removal of the walls bounding the closed space, the sealing body might be deformed. In order to avoid the latter, the core part is returned to the respective core after having filled the closed space, whereupon the core can be removed without any deformation of the molded sealing body.

The invention also relates to a socket of plastic material, preferably of thermoplastic material, comprising a groove, in which a sealing body of resilient material is received, the sealing body consisting of a plastic elastomer, preferably a thermoplastic elastomer being fixed with respect to the inner wall of the groove and preferably intimately bonded therewith.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a pipe part of thermoplastic material with a socket comprising a core;

FIG. 2 is the same pipe part during molding the sealing body;

FIG. 3 is part of a pipe part with a groove and an aperture applied therein, and FIGS. 4a and 4b show the molding of part of a socket with a groove.

DESCRIPTION OF PREFERRED EMBODIMENTS

In order to best understand the present invention a description of preferred embodiments thereof is provided accompanied by drawings. FIG. 1 is a plastic pipe part 1 of thermoplastic material. This material may e.g. by polyvinylchloride, polyethylene or polypropylene, but obviously the scope of the present invention is not limited to said plastics.

The plastic pipe part 1 is provided with a socket 2, comprising an annular bead 11, by means of which the annular groove chamber 3 is shaped.

Socket part 2 is e.g. molded by injection molding while applying an inner core 4, with an elevation 5 adapted to the annular groove chamber 3.

Obviously, said groove chamber 3 may be shaped in many manners, analogue to the state of the art. A very special method for shaping said groove chamber will be described later on.

Referring now to FIG. 2 the core 4 comprises a connecting wall part 7, being connected with an inflatable core part 6. After having moved said core part 6 toward the inside of the socket, and after having inflated the same, its final condition will cause said core part 6 to adjoin the inside of the socket 2, beside the groove chamber 3.

By means of a metal pipe a channel 8 is made in the wall of the groove chamber 3, whereupon flowable thermoplastic elastomer can be injected into the formed space 12, through said metal channel 8.

Because of the good uniting properties of thermoplastic elastomer and thermoplastic pipe material, a very intimate bonding between the head part 9 of the sealing body, consisting of thermoplastic elastomer and the inner wall 3a of the annular groove chamber 3 is accomplished.

The connecting wall 7 bounds the dimensions of the sleeve-shaped or the lip-shaped part 10 of the sealing body of thermoplastic elastomer.

After having filled space 12 with thermoplastic elastomer and after having cured said thermoplastic elastomer mass, core part 6 is withdrawn so that its outer diameter is not greater than the outer diameter of wall part 7. Subsequently core part 6 with connecting wall part 7, is drawn into core 4, so that core 4 can be removed from the socket without derforming the sleeve-shaped or lip-shaped part 10 of the sealing body of thermoplastic elastomer.

In order to perforate the wall of the annular groove chamber 3 by means of the metal pipe 8, it is recommended to maintain the plastic material in a plasticized condition.

FIG. 3 shows, however that the wall of the groove chamber may also be provided with a bore 13 during shaping the annular groove chamber 3. In a manner, corresponding to that as shown in FIG. 2, the desired sealing body is then obtained, said sealing body comprising a head 9, and a sealing sleeve or sealing lip 10, which head 9 is intimately bonded with the inner wall of the groove chamber 3.

Referring now to FIG. 4, a core 15 is disposed in a heated socket end, the core part 14 being radially displaceable.

The socket end is surrounded by a mould part 16, whereupon air, introduced through channel 17 is blown into groove 18 in the socket end. After having replaced core part 20 by another core part 19, or after having sealed off the channel 17, the molding cavities 19a and 19b are filled by injection with a thermoplastic rubber. After curing, core part 19 is drawn toward the outside whilst core part 14 is drawn toward the inside (FIG. 4b).

The advantage of this method is that a simple mold can be used.

What is claimed is:

1. In a method for installing a sealing body having a lip shaped part 10 of resilient material in a groove 3 of a socket 2 of plastic material the steps comprising forming a closed space 12 inside said socket 2 which space embraces the walls of an axially movable inner core part 4 and a radially retractable core part 6, filling said groove 3 and space 12 with a flowable elastomeric composition confined by the walls of interconnected core parts 4 and 6, and axially removing inner core part 4 and inner core part 6 after radially retracting core part 6, whereby the lip shaped part 10 of the sealing body is undeformed by removing the core parts.

2. The method of claim 1 wherein closed space 12 is bounded by a core comprising core part 6 which is moveable radially inwardly toward the axis of socket 2 which core part 4 remains connected with the core part 6 through a connecting wall 7 at the moment of moving core part 6 radially toward the axis of socket 2.

* * * * *